United States Patent [19]

You

[11] Patent Number: 5,687,765
[45] Date of Patent: Nov. 18, 1997

[54] 3-POSITION 3-WAY SOLENOID VALVE

[75] Inventor: Jang-Yeol You, Seoul, Rep. of Korea

[73] Assignee: Daewoo Electronics Co., Ltd., Seoul, Rep. of Korea

[21] Appl. No.: 582,738

[22] Filed: Jan. 4, 1996

[30] Foreign Application Priority Data

Feb. 9, 1995 [KR] Rep. of Korea .................. 95-2309

[51] Int. Cl.$^6$ .................. F16K 11/16; F16K 31/10
[52] U.S. Cl. .................. 137/627.5; 137/596.17; 303/119.2; 251/129.19
[58] Field of Search .................. 137/596.17, 627.5, 137/870, 625.65; 303/119.2; 251/129.19

[56] References Cited

U.S. PATENT DOCUMENTS

| | | | |
|---|---|---|---|
| 3,534,772 | 10/1970 | Stampfli et al. | 137/625.65 |
| 3,972,505 | 8/1976 | Padula | 137/625.65 |
| 3,983,909 | 10/1976 | Anglade | 137/625.65 |
| 4,527,590 | 7/1985 | Kolze | 137/625.65 |
| 4,922,966 | 5/1990 | Kaes et al. | 303/119.2 |
| 5,248,191 | 9/1993 | Kondo et al. | 137/625.65 |

*Primary Examiner*—Denise L. Ferensic
*Assistant Examiner*—Joanne Y. Kim
*Attorney, Agent, or Firm*—Beveridge, DeGrandi, Weilacher & Young LLP

[57] ABSTRACT

A 3-position 3-way solenoid valve for anti-lock brake system is disclosed having a hinge structure. The solenoid valve includes a cylindrical housing and two covers hermetically coupled to both ends of the housing. The housing and two covers define an inner chamber which is partitioned into first and second chambers by a barrier, and first to third ports are communicated with the first chamber. The second chamber contains an armature, a solenoid assembly and a core, and the armature is fixed to a push rod which extends into the first chamber through a barrier hole. An end of the push rod in the first chamber is fitted to a ball slider within which a ball is included interposing a first spring. A second spring interposes between the cover defining the first chamber and one end of the ball slider. A step is formed on the outer wall of the ball slider. A valve lever extends substantially parallel with the ball slider to be caught with the step. A spool is fixed to one end of the valve lever in parallel with the valve lever. The valve lever is connected to a supporting rod by a pin to rock both ends of the valve lever, and the supporting rod is fixed to the cover. A third spring is disposed between the valve lever and the cover to be coaxial with the ball slider.

9 Claims, 6 Drawing Sheets

3-POSITION 3-WAY SOLENOID VALVE

BACKGROUND OF THE INVENTION

1. Field of the Invention

The present invention relates to a 3-position 3-way solenoid valve for an anti-lock brake system, and more particularly to a 3-position 3-way solenoid valve for an anti-lock brake system having excellent assemblage and workability with a simple structure.

2. Description of the Prior Art

Currently, an anti-lock brake system which prevents locking of wheels during performing a braking operation of a vehicle to shorten a braking distance and improve steering is mounted to various vehicles. If wheels are locked during the braking operation to slide along a road surface, a frictional force between tires and the road surface is decreased to lengthen the braking distance and abruptly degrade a steering performance of a vehicle. The anti-lock brake system repeatedly increases, maintains or decreases a braking pressure exerted upon the wheels to impede the locking of wheels. It is generally referred to that the increase of the braking pressure is designated as a increase mode, maintaining thereof is a hold mode, and decreasing thereof is a decrease mode. The anti-lock brake system is generally formed of a pressure generating source which is not a master cylinder, i.e., a pump and the like, valves operated by an electric signal, sensors for monitoring a rotating speed of the wheels and a controller for opening/closing the valves in accordance with a predetermined algorithm for attaining an effective braking operation.

Figure 1:
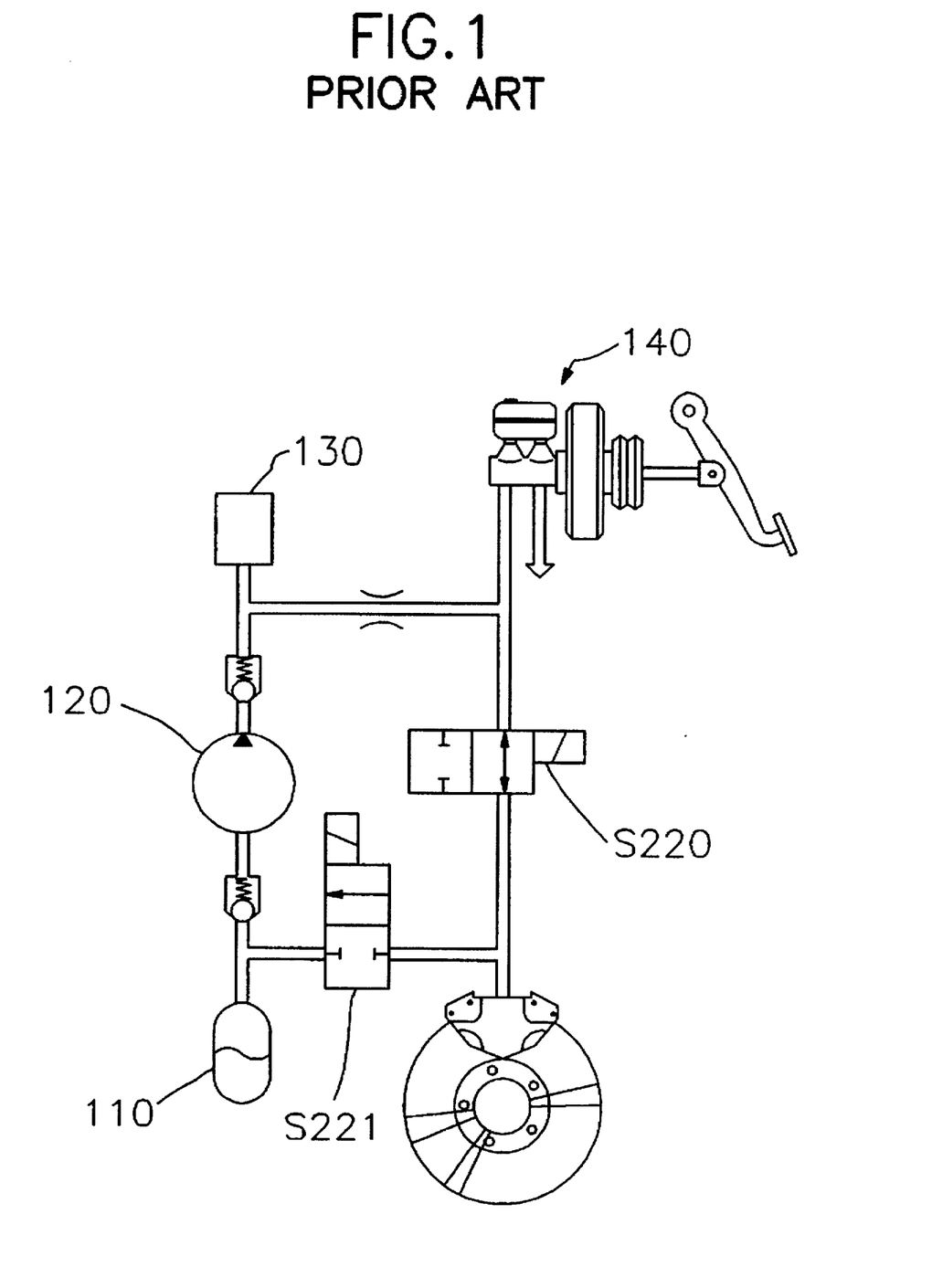
FIG. 1 is a schematic view showing a hydraulic system of an anti-lock brake system utilizing 2-position 2-way solenoid valves.

FIG. 1 is a schematic circuit diagram of a hydraulic system showing an anti-lock brake system utilizing two 2-position 2-way (hereinafter simply referred to as "2/2") solenoid valves of normally open and normally close types. In a increase mode, current is not supplied to first and second 2/2 solenoid valves S220 and S221 to open first valve S220 at an outlet side of a hydraulic pump 110 and close second valve S221 at an inlet side of hydraulic pump 110, so that an oil pressure generated from hydraulic pump 110 is supplied to a brake wheel cylinder mounted to the wheel. In a static pressure mode, a current signal is supplied to first valve S220 to close it, thereby constantly maintaining the pressure of the brake wheel cylinder. In a decrease mode, the current signal is supplied to first and second valves S220 and S221 to close first valve S220 and open second valve S221, so that the pressure in the brake wheel cylinder is decreased. Such a system is stably operated, but two solenoid valves are employed with respect to a single channel to require eight solenoid valves in a 4-channel brake system. Therefore, the required number of valves are increased, and the overall brake system becomes bulky.

Figure 5:
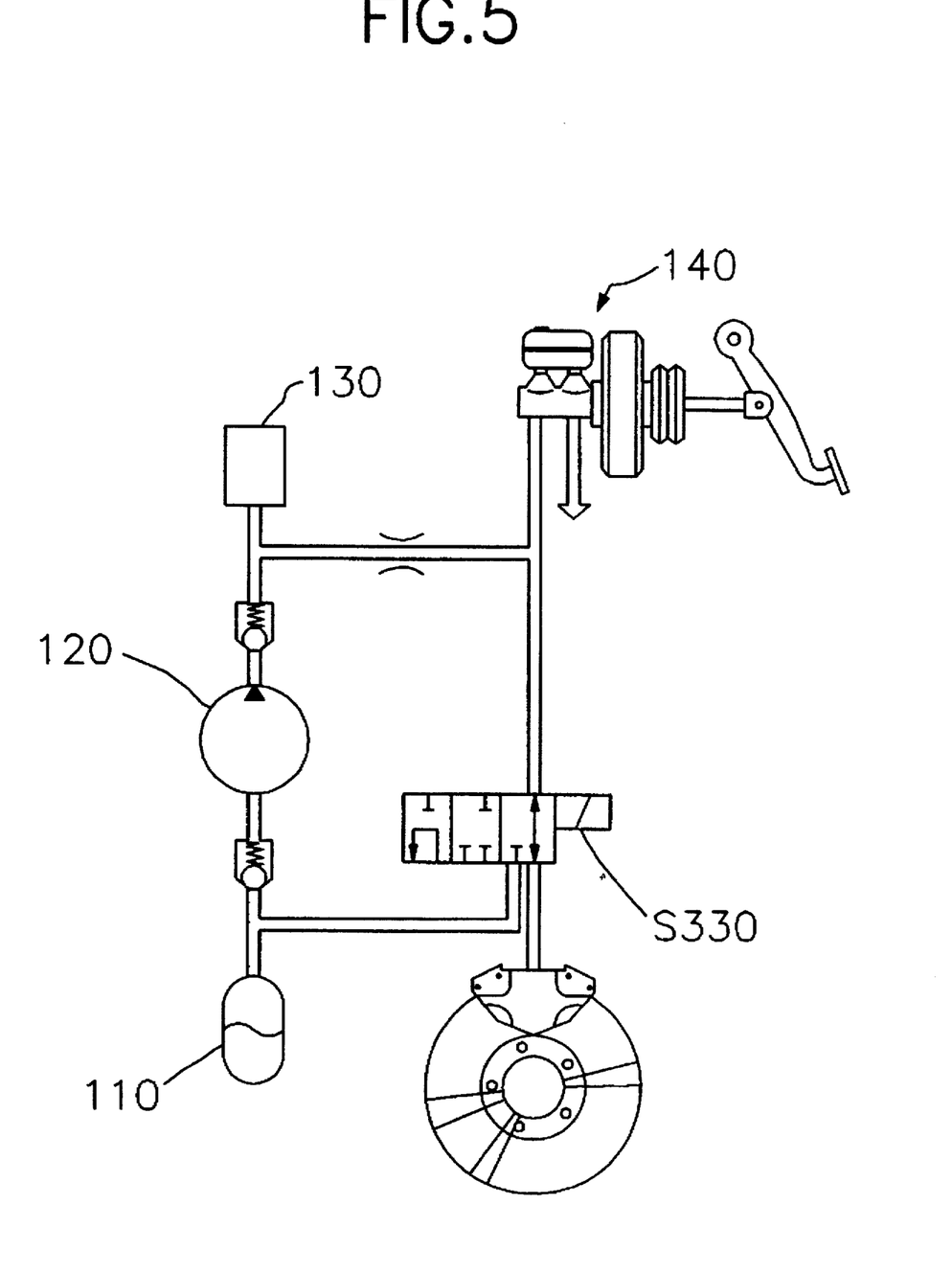
FIG. 5 is a schematic view showing a hydraulic system of an anti-lock brake system utilizing a 3-position 3-way solenoid valve.

Meanwhile, in order to reduce the number of solenoid valves, an anti-lock brake system using a 3-position 3-way solenoid valve as shown in FIG. 5 has been developed to be currently available. When the 3-position 3-way solenoid valve is used, one solenoid valve is used per channel to reduce the required number of solenoid valves by half when compared with using the 2/2 solenoid valves.

Figure 2:
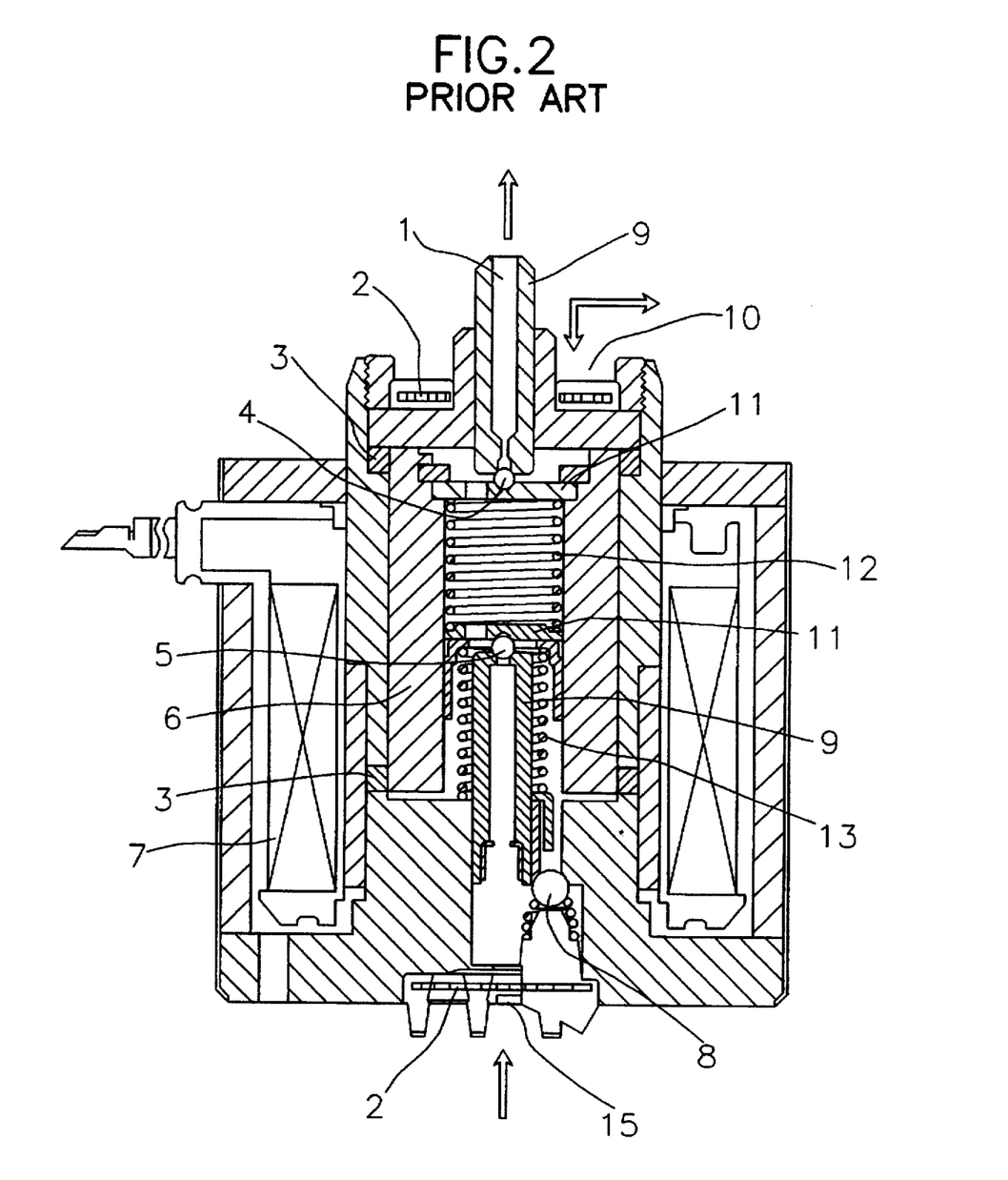
FIG. 2 is a sectional view showing a conventional 3-position 3-way solenoid valve.

FIG. 2 is a sectional view showing a conventional 3-position 3-way solenoid valve manufactured by BOSCH Co., in which an internal valve chamber is prevented from being contaminated by means of a filter 2 at the inlet and outlet thereof. A valve body 9 having a flow passage therein is placed immediately in front of an inlet valve 5 and immediately at the back of an outlet valve 4. The flow passage is opened/closed by inlet valve 5 and outlet valve 4. For the purpose of securing high reliability and minimum friction, an armature 6 is led by a non-magnetic bearing ring 3. A main spring 13 and an auxiliary spring 12 are installed at the center portion. A steel ball is soldered onto a carrier plate 11 to serve as a sealing member. A winding 7 is wrapped by a plastic to be protected from becoming wet by fluid. A first port 15 is communicated with a master cylinder 140 (refer to FIG. 5) and pump 120 (refer to FIG. 5), respectively. A second port 10 is communicated with a brake wheel cylinder mounted to a wheel, and a third port 1 is communicated with an accumulator 110 (refer to FIG. 5). A check valve 8 disposed in parallel with inlet valve 5 is opened when a brake is released to enable abrupt draining.

In the conventional 3-position 3-way solenoid valve as shown in FIG. 2, the flow passage is formed by penetrating the solenoid valve. If the solenoid valve is used to form a modulator, a modulator block is divided into upper and lower blocks to have respective flow passages connected to the respective ports of the solenoid valve. As the result, the structure of the modulator is complicated to deteriorate the assemblage as well as degrade workability.

SUMMARY OF THE INVENTION

The present invention is devised to solve the foregoing problems. It is an object of the present invention to provide a 3-position 3-way solenoid valve with a hinged structure, the solenoid valve having a simple structure and being capable of simplifying a structure of a modulator block.

To achieve the above object of the present invention, there is provided a 3-position 3-way solenoid valve comprising:

a valve body having a housing with a first port for receiving fluid from a pressure generating source, a second port for admitting/discharging the fluid and a third port for exhausting the fluid, and first and second covers hermetically coupled to the housing for closing both ends of the housing;

a barrier wall for partitioning a chamber formed by the housing and the first and second covers into first and second chambers, the first chamber being communicated with the first, second and third ports, the barrier wall having a barrier hole;

opening/closing means extending from the first chamber to the second chamber through the barrier hole for communicating the first port with the second port, communicating the second port with the third port, or not communicating the first, second and third ports with one another by closing the first port, the third port or the first and third ports in response to electric signals, the opening/closing means being located at first position of opening the first port and closing the third port in a normal state that no electric signal is supplied, at second position of closing the first and third ports in a first active state that a primary signal having a half of maximum voltage to be applied is supplied, or at a third position of closing the first port and opening the third port in a second active state that a secondary signal having the maximum voltage is supplied; and a solenoid assembly for moving the opening/closing means located at the first position in the normal state to the second position in response to supplying of the primary electric signal and to the third position in response to supplying of the secondary electric signal, the solenoid assembly being composed of an annular solenoid coil, a bobbin wound by the solenoid coil and terminals electrically connected to the solenoid coil and exposed to the outside of the valve body and being disposed within the second chamber to surround the opening/closing means.

The first cover and the barrier wall define the first chamber, the second cover and the barrier wall define the second chamber, the first port is provided at the center of the first cover, the third port is provided at the first cover apart from the first port at a distance, and the second port is provided to the housing.

The opening/closing means comprises:

first valve means provided coaxially with the first port for opening/closing the first port, the first valve means being composed of an inlet ball for opening/closing the first port, a hollow cylindrical ball slider for receiving the ball in the inside thereof, having a first step provided to one end thereof for preventing the taking-out of the inlet ball and a second step formed on the outer wall thereof, a first spring received within the ball slider for pressing the inlet ball, and a second spring interposed between the first cover and one end of the ball slider to which the inlet ball is located for pressing the ball slider;

second valve means for opening/closing the third port, composed of a supporting rod provided between the first port and the third port in parallel with the first valve means and having one end thereof fixed to the first cover, L-shaped hinged valve means having a spool for opening/closing the third port and a valve lever extending in parallel with the spool to be caught by the second step and coupling with the other end of supporting rod by a pin, and a third spring interposed between the valve lever and the first cover to surround the ball slider for pressing the valve lever;

an armature moving in response to a magnetic force generated from the solenoid assembly; and a push rod extending from the first chamber to the second chamber through the barrier hole and having both ends thereof fixed to the armature and the ball slider.

In the normal state, the valve lever stands apart from the second step by a predetermined distance which is substantially equal to the distance between the inlet ball and the first port.

Preferably, the ball slider is provided with a small outer-diametric portion extending from one end of the ball slider to which the inlet ball is located and a large outer-diametric portion extending from the other end of the ball slider and being larger than the small outer-diametric portion in outer diameter, and the second step is formed by the difference in outer diameter between the small outer-diametric portion and the large outer-diametric portion.

For instance, the valve lever is a rectangular flat plate having a first hole provided to the other end thereof longitudinally opposite to one end thereof to which the spool is fixed for inserting the ball slider and a second hole provided between both ends thereof for inserting one end of the supporting rod, the one end of the supporting rod and the valve lever are connected with each other by the pin so that both ends of the valve lever are rocked, and the second step cannot pass through the first hole.

If a modulator is manufactured by using the solenoid valve according to the present invention, an upper block only of the modulator includes flow passages which are communicated with each of the ports of solenoid valves. Accordingly, the structure of the modulator becomes simply and then the workability thereof is improved.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE PREFERRED EMBODIMENT

Figure 3:
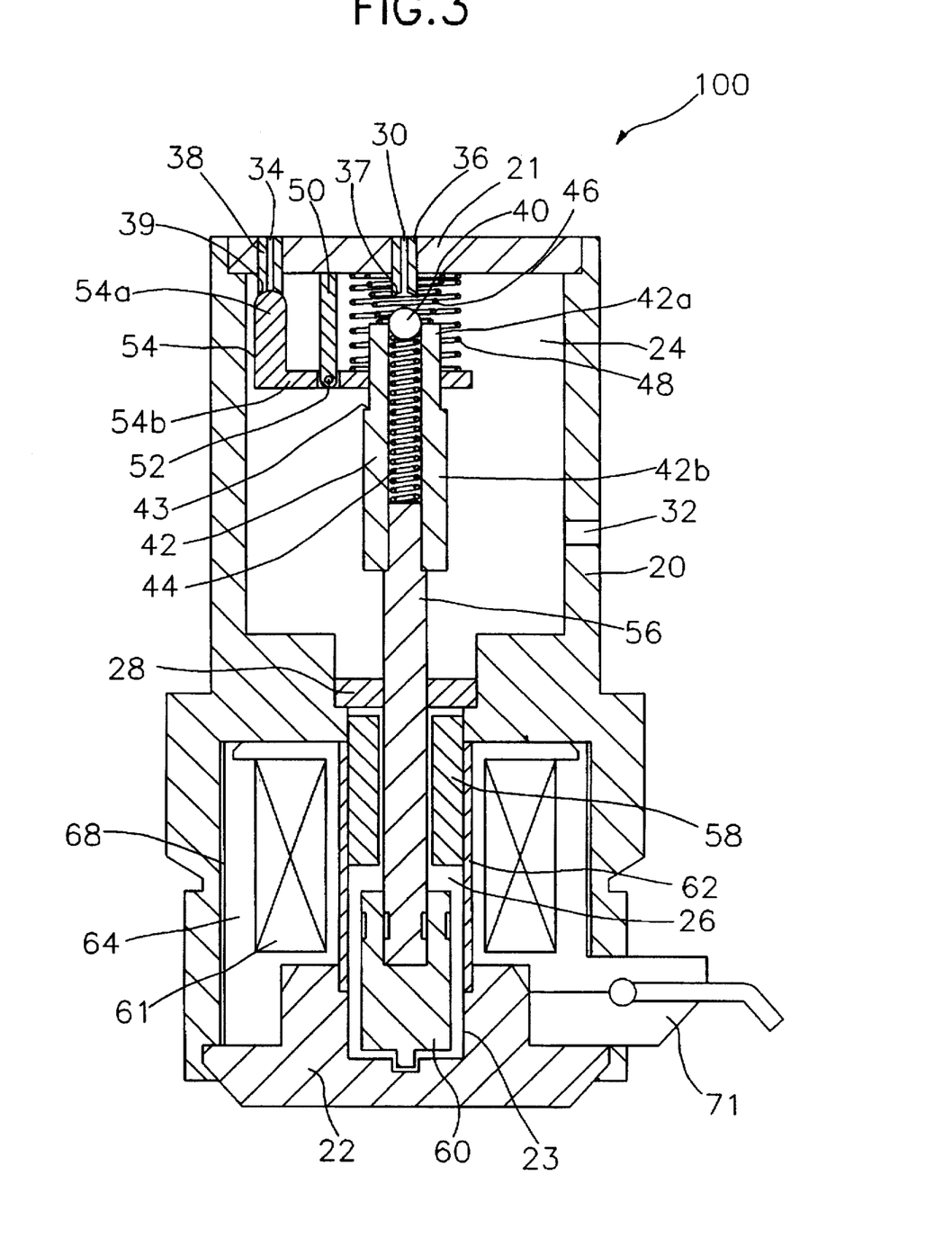
FIG. 3 is a sectional view showing a 3-position 3-way solenoid valve according to the present invention.

The preferred embodiment of a 3-position 3-way solenoid valve according to the present invention will be described in detail with reference to FIG. 3.

The 3-position 3-way solenoid valve according to this embodiment includes a hollow cylindrical housing 20 and covers 21 and 22 hermetically coupled to both ends of housing 20. Cover 21 is a circular flat plate, and cover 22 includes a recess 23 of a predetermined dimension at the center of one side thereof. First and second chambers 24 and 26 are provided within housing 20, wherein cover 21 and a bushing 28 define first chamber 24, and cover 22 and bushing 28 define second chamber 26. First chamber 24 is communicated with each of first, second and third ports 30, 32 and 34. First port 30 is a nozzle hole of an inlet nozzle 36 provided at the center of cover 21, second port 32 is a opening formed to a side wall of housing 20, and third port 34 is a nozzle hole of exhaust nozzle 38 provided to cover 21.

First chamber 24 contains an inlet ball 40, a hollow cylindrical ball slider 42, first, second and third springs 44, 46 and 48, a supporting rod 50, a pin 52 and a hinged valve 54. Inlet ball 40 and ball slider 42 are disposed coaxially with inlet nozzle 36. Inlet ball 40 is received within ball slider 42 to reciprocate along an inner wall of ball slider 42 and is located to one end of ball slider 42 to expose part of inlet ball 40. Also, inlet ball 40 and first port 30 are disposed confronting each other so that first port 30 is opened/closed. Though not shown in the drawings, a step is formed to one end of ball slider 42 to which inlet ball 40 is located, so that inlet ball 40 is taken out through the one end of ball slider 42. An inlet ball seating surface 37 formed on inlet nozzle 36 is shaped to match with inlet ball 40 to enable the opening/closing operation of inlet nozzle 36.

The inner diameter of ball slider 42 is determined so that inlet ball 40 can be accepted therewithin and move along the inner wall of ball slider 42. Ball slider 42 is divided into a small outer-diametric portion 42a and a large outer-diametric portion 42b on a basis of the difference in outer diameter. Small outer-diametric portion 42a extends by a predetermined length from the one end of ball slider 42 to which inlet ball 40 is located, and the remaining part of ball slider 42 forms large outer-diametric portion 42b. As the result, a step 43 is provided to outer wall of ball slider 42. A push rod 56 is fitted into the other end of ball slider 42 in a coaxial relationship and extends to second chamber 26 through bushing 28. Bushing 28 serves for supporting push rod 56 and an opening through which push rod 56 passes is formed at the center thereof. First spring 44 is disposed within ball slider 42, both ends of first spring 44 being supported respectively to inlet ball 40 and one end of push rod 56 fitted into the other end of ball slider 42, so that inlet ball 40 is pressed toward the one end of ball slider 42 by resilient force of first spring 44. Second spring 46 is disposed between cover 21 and ball slider 42 coaxially with inlet nozzle 36, and both ends of second spring 46 are supported respectively to the one end of ball slider 42 and cover 21. First port 30 is maintained opened by resilient force of second spring 46 in the inactive state that electric current is not applied to a solenoid coil 61.

Supporting rod 50 is located parallel to ball slider 42 and between inlet nozzle 37 and exhaust nozzle 38, and one end of supporting rod 50 is fixed to cover 21. By means of pin 52, the other end of supporting rod 50 is coupled with hinged valve 54 serving for opening/closing exhaust nozzle 38. Hinged valve 54 has an L-shape and is composed of a spool 54a for opening/closing exhaust nozzle 38 and a valve lever 54b perpendicular to spool 54a. An end of spool 54a is shaped to match with a valve seating surface 39 of exhaust nozzle 38. Valve lever 54b is connected to supporting rod 50 by means of pin 52 and extends substantially perpendicular to supporting rod 50 so that step 43 formed on the outer wall of ball slider 42 can catch valve lever 54b. Third spring 48 is provided between cover 21 and valve lever 54b which are located in a perpendicular relationship to surround second spring 42. Resilient force of third spring 48 allows spool 54a of hinged valve 54 to close third port 34 in the inactive state that electric current is not applied to solenoid coil 61. In the inactive state, valve lever 54b and step 43 stand apart from each other by a predetermined distance that is substantially equal to the distance between inlet ball 40 and inlet nozzle 36.

Second chamber 26 contains a core 58 and an armature 60. Push rod 56 extends into first chamber 24 through bushing 28. One end of push rod 56, located within first chamber 24, is fitted to ball slider 42, and the other end thereof, located within second chamber 26, is fixed to armature 60 in a coaxial relationship. Core 58 is fixed to the inner wall of housing 20 and the inner wall of a cylindrical sealing member 62 to encircle push rod 56 and has a hole through which push rod 56 passes at the center thereof. Core 58 is formed of a ferromagnetic material to be magnetized by a magnetic force generated by solenoid coil 61.

An annular solenoid assembly 68 is provided within second chamber 26 to surround sealing member 62. Solenoid assembly 68 is formed of an annular solenoid coil 61 and a bobbin 64 for winding solenoid coil 61 thereon. Bobbin 64 is integrally formed by molding or the like to prevent the fluid from permeating to solenoid coil 61 which stands wound therewithin. Additionally, solenoid assembly 68 is provided to surround sealing member 62 by which solenoid assembly 68 is shielded from the fluid within second chamber 26. Electric terminals 71 are exposed to the outside of solenoid valve 100 to be connected to electric wires through which electric power is supplied to solenoid coil 61.

One end of cylindrical sealing member 62 is hermetically fixed to housing 20 by means of a caulking processing or the like, and the other thereof is hermetically fitted to cover 22. Recess 23 of cover 22 receives part of armature 60.

FIG. 5 illustrates a schematic view showing a hydraulic system when 3-position 3-way solenoid valves are utilized to construct an anti-lock brake system. First port 30 is communicated with a master cylinder 140, second port 32 is communicated with a brake wheel cylinder (not shown) mounted to a wheel, and third port 34 is communicated with the inlet of pump 120 and an accumulator 110.

Figure 6:
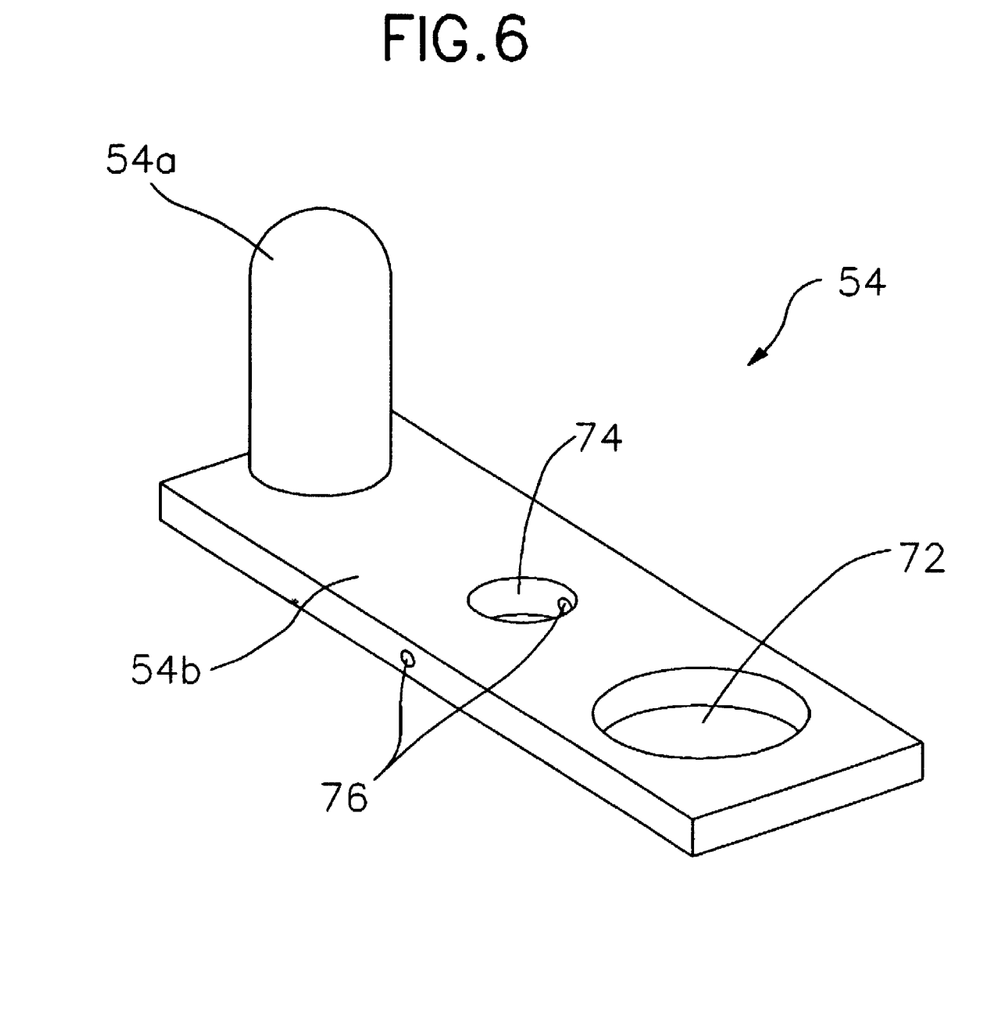
FIG. 6 is a perspective view showing an example of a hinged valve included in the solenoid valve according to the present invention.

FIG. 6 is a perspective view showing hinged valve 54 according to this embodiment. Spool 54a has a cylindrical shape, one end thereof is fixed to valve lever 54b in a perpendicular relationship, and the other end thereof is shaped to match with valve seating surface 39 of exhaust nozzle 38. Valve lever 54b is a rectangular flat plate, a hole 72 for a ball slider is formed to the other end of valve lever 54b opposite to one end thereof to which spool 54a is fixed, and a hole 74 for a supporting rod is formed between both ends of valve lever 54b. The diameter of hole 72 is determined so that small outer-diametric portion 42a of ball slider 42 can pass therethrough and large outer-diametric portion 42b can't pass therethrough. A pin inserting hole 76 is transversely formed to intersect hole 74. Hinged valve 54 is not limited as shown and may be changed in various shapes as long as it has the same operational characteristic. For instance, spool 54a may be replaced by a ball.

Hereinafter, an operation of solenoid valve 100 according to the present invention will be described with reference to FIGS. 3, 4 and 5.

Figure 4A:
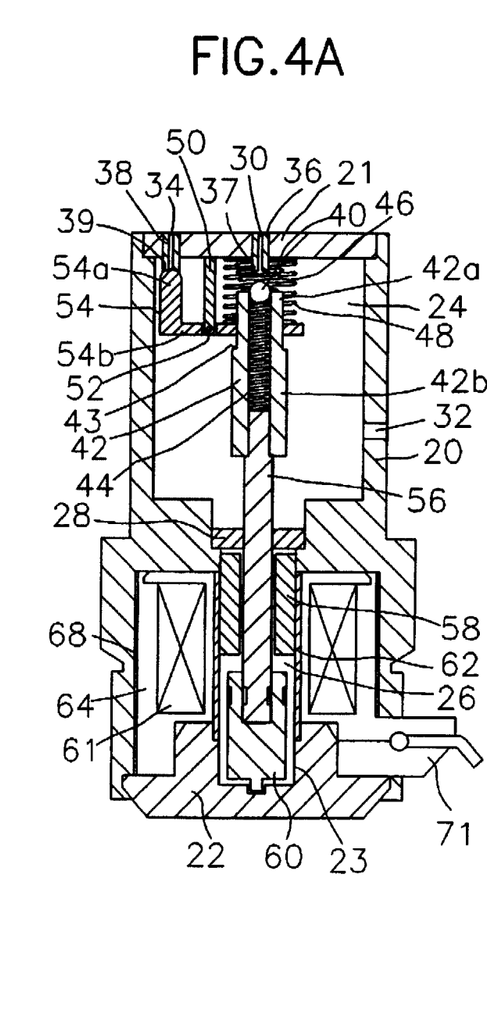
FIGS. 4A to 4C are sectional views showing an operating state of the 3-position 3-way solenoid valve according to the present invention in increase, hold and decrease modes, respectively.
Figure 4B:
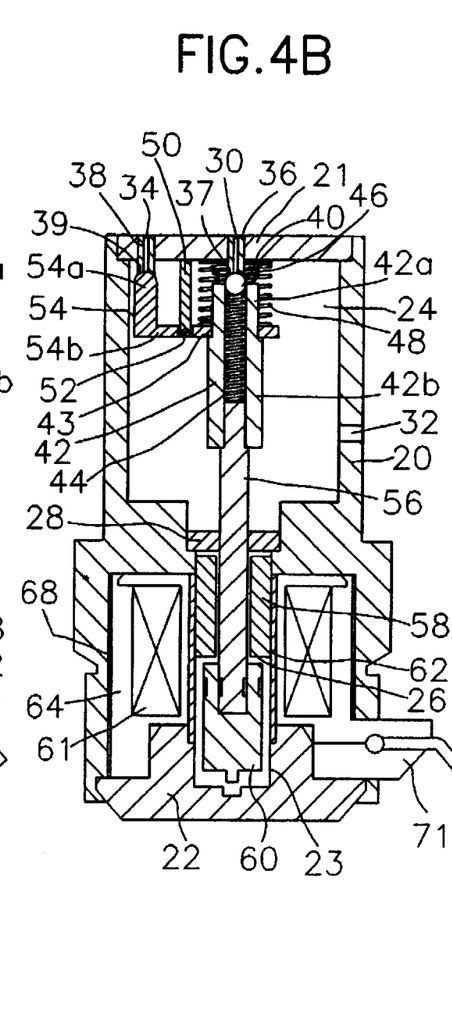
Figure 4C:
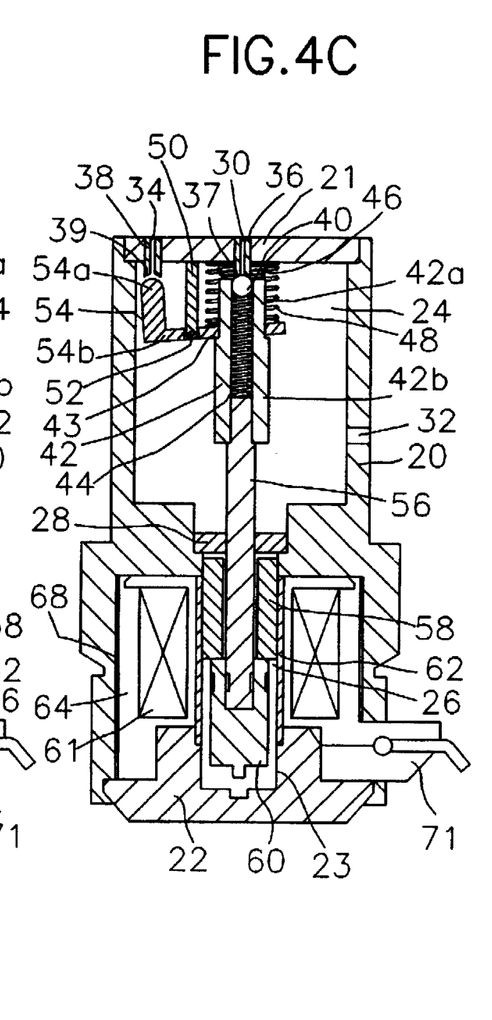

In an increase mode, solenoid valve 100 is supplied with no electric signal and hence, as shown in FIG. 4A, spool 54a of hinged valve 54 is seated on valve seating surface 39 by the resilient force of third spring 48 to close third port 34. Moreover, inlet ball 40 stands apart from inlet nozzle 36 by the resilient force of second spring 46 to open first port 30. At this time, armature 60 is located most adjacent to cover 22.

Consequently, first and second ports 30 and 32 are communicated with each other, so that hydraulic pressure generated by master cylinder 140 and pump 120 is supplied to the brake wheel cylinders mounted to wheels to raise braking pressure.

In a hold mode, a primary electric signal having a half of maximum voltage to be applied is supplied to solenoid coil 61. In response to this, as shown in FIG. 4B, armature 60 moves toward cover 21 by overcoming the resilient force of second spring 46, so that inlet ball 40 closes first port 30. At this time, valve lever 54b of hinged valve 54 starts to come in contact with step 43 formed on the outer wall of ball slider 42. But valve lever 54b doesn't move yet, so that third port 34 stands closed.

Consequently, first, second and third ports 30, 32 and 34 are not communicated with one another, so that the constant braking pressure is maintained.

In a decrease mode, a secondary electric signal having the maximum voltage is supplied to solenoid coil 61. In response to this, as shown in FIG. 4C, armature 60 moves to the extreme movable position thereof by overcoming the resilient force of first and third springs 44 and 48. Since ball slider 42 moves under the state that valve lever 54b engages with step 43, one end of valve lever 54b engaging with step 43 moves toward cover 21. By the principle of lever, spool 54a is apart from exhaust nozzle 38 to open third port 34.

Consequently, second and third ports 32 and 34 are communicated with each other, so that the hydraulic pressure of the brake wheel cylinders is exhausted through second and third ports 32 and 34 toward accumulator 110, thereby decreasing the braking pressure.

The 3-position 3-way solenoid valve according to the present invention is formed by partitioning the solenoid valve into an electric part having electric elements and a hydraulic part associated with the fluid. The flow passage passing through the inside of the solenoid valve longitudinally is not formed, and ports for admitting/discharging the fluid are formed to a half portion of the solenoid valve.

When the modulator is constructed by utilizing the solenoid valve according to the present invention, flow passages connected to respective ports of the solenoid valve are formed only in the upper block of the modulator block. Therefore, the modulator is simply constructed to improve workability.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A solenoid valve comprising:

a valve body having a housing with a first port for receiving fluid from a pressure generating source, a second port for admitting/discharging the fluid and a third port for exhausting the fluid, and first and second covers hermetically coupled to said housing for closing opposite open ends of said housing;

a barrier wall for partitioning a chamber formed by said housing and said first and second covers into first and second chambers, said first chamber being communicated with said first, second and third ports, said barrier wall having a barrier hole;

actuating means extending from said first chamber to said second chamber through said barrier hole for communicating said second port with one of said first and third ports, and interrupting fluid communication between said first to third ports by closing one of said first and third ports and both of said first and third ports in response to electric signals, said actuating means being located at a first position of opening said first port and closing said third port in a normal state that no electric signal is supplied, at a second position of closing said first and third ports in a first active state that a primary signal having a half of maximum voltage to be applied is supplied, and at a third position of closing said first port and opening said third port in a second active state that a secondary signal having the maximum voltage is supplied; and a solenoid assembly for moving said actuating means located at said first position in said normal state to said second position in response to supplying of said primary electric signal and to said third position in response to supplying of said secondary electric signal, said solenoid assembly being composed of an annular solenoid coil, a bobbin wound by said solenoid coil and terminals electrically connected to said solenoid coil and exposed to the outside of said valve body and being disposed within said second chamber to surround said actuating means, wherein said first cover and said barrier wall define said first chamber, said second cover and said barrier wall define said second chamber, said first port is provided at the center of said first cover, said third port is provided at said first cover apart from said first port at a distance, and said second port is provided to said housing.

2. The solenoid valve as claimed in claim 1, wherein said actuating means comprises:

first valve means provided coaxially with said first port for opening and closing said first port, said first valve means being composed of an inlet ball for opening and closing said first port, a hollow cylindrical ball slider for receiving said ball in the inside thereof, having a first step provided to one end thereof for preventing the taking-out of said inlet ball and a second step formed on the outer wall thereof, a first spring received within said ball slider for pressing said inlet ball, and a second spring interposed between said first cover and one end of said ball slider to which said inlet ball is located for pressing said ball slider;

second valve means for opening and closing said third port, composed of a supporting rod provided between said first port and said third port in parallel with said first valve means and having one end thereof fixed to said first cover, L-shaped hinged valve means having a spool for opening and closing said third port and a valve lever extending in parallel with said spool to be caught by said second step and coupling with the other end of supporting rod by a pin, and a third spring interposed between said valve lever and said first cover to surround said ball slider for pressing said valve lever;

an armature moving in response to a magnetic force generated from said solenoid assembly; and a push rod extending from said first chamber to said second chamber through said barrier hole and having one end thereof fixed to said armature and the other end thereof fixed to said ball slider, further comprising a cylindrical core provided within said second chamber for movably passing said push rod through a hole formed thereto in a coaxial relationship and pulling said armature by generating a magnetic force in response to the magnetic flux produced from said solenoid coil, wherein in said normal state, said valve lever stands apart from said second step by a predetermined distance which is substantially equal to the distance between said inlet ball and said first port.

3. The solenoid valve as claimed in claim 2, wherein said first port is a nozzle hole of an inlet nozzle provided at the center of said first cover, said second port is an opening provided to said housing, said third port is a nozzle hole of an exhaust nozzle provided to first cover apart from said inlet nozzle, and said barrier wall is a bushing.

4. The solenoid valve as claimed in claim 1, further comprising a cylindrical sealing member provided within said second chamber coaxially with said housing, wherein said bobbin is provided to surround said sealing member, and one end of said sealing member is hermetically coupled with the inner wall of said housing and the other end of said sealing member is hermetically fitted to a groove formed to said second cover so that said bobbin is protected from the fluid.

5. The solenoid valve as claimed in claim 3, wherein said inlet nozzle is provided with an inlet ball seating surface for eating said inlet ball, said exhaust nozzle is provided with a valve seating surface for seating said spool of said hinged valve, and said inlet ball seating surface and said valve seating surface are shaped to match with the shapes of said inlet ball and said spool to be seated, so that said first port is closed when said inlet ball is seated on said inlet ball seating surface and said third port is closed when said spool is seated on said valve seating surface.

6. The solenoid valve as claimed in claim 2, wherein said first cover is a circular flat plate, and a recess for receiving part of said armature is formed at the center portion of a side of said second cover.

7. The solenoid valve as claimed in claim 2, wherein said ball slider is provided with a first extending portion extending from one end of said ball slider to which said inlet ball is located and a second extending portion extending from the other end of said ball slider and being larger than said first extending portion in outer diameter, and said second step is formed by the difference in outer diameter between said first extending portion and said second extending portion.

8. The solenoid valve as claimed in claim 2, wherein said valve lever is a rectangular flat plate having a first hole provided adjacent to one end thereof longitudinally opposite to the other end thereof to which said spool is perpendicularly fixed for inserting said ball slider and a second hole provided between said first hole and the other end thereof for inserting one end of said supporting rod, said one end of said supporting rod and said valve lever are connected with each other by said pin so that said valve lever is rocked around said pin, and said second step cannot pass through said first hole.

9. A solenoid valve comprising:
a valve body having a housing with a first port for receiving fluid from a pressure generating source, a second port for admitting/discharging the fluid and a third port for exhausting the fluid, and first and second covers hermetically coupled to said housing for closing opposite open ends of said housing;
a barrier wall for partitioning a chamber formed by said housing and said first and second covers into first and second chambers, said first chamber being communicated with said first, second and third ports, said barrier wall having a barrier hole;
actuating means extending from said first chamber to said second chamber through said barrier hole for communicating said second port with one of said first and third ports, and interrupting fluid communication between said first to third ports by closing one of said first and third ports and both of said first and third ports in response to electric signals, said actuating means being located at a first position of opening said first port and closing said third port in a normal state that no electric signal is supplied, at a second position of closing said first and third ports in a first active state that a primary signal having a half of maximum voltage to be applied is supplied, and at a third position of closing said first port and opening said third port in a second active state that a secondary signal having the maximum voltage is supplied; and
a solenoid assembly for moving said actuating means located at said first position in said normal state to said second position in response to supplying of said primary electric signal and to said third position in response to supplying of said secondary electric signal, said solenoid assembly being composed of an annular solenoid coil, a bobbin wound by said solenoid coil and terminals electrically connected to said solenoid coil and exposed to the outside of said valve body and being disposed within said second chamber to surround said actuating means,
wherein said first cover and said barrier wall define said first chamber, said second cover and said barrier wall define said second chamber, said first port is provided at the center of said first cover, said third port is provided at said first cover apart from said first port at a distance, and said second port is provided to said housing,
wherein said actuating means comprises:
first valve means provided coaxially with said first port for opening and closing said first port, said first valve means being composed of an inlet ball for opening and closing said first port, a hollow cylindrical ball slider for receiving said ball in the inside thereof, having a first step provided to one end thereof for preventing the taking-out of said inlet ball and a second step formed on the outer wall thereof, a first spring received within said ball slider for pressing said inlet ball, and a second spring interposed between said first cover and one end of said ball slider to which said inlet ball is located for pressing said ball slider;
second valve means for opening and closing said third port, composed of a supporting rod provided between said first port and said third port in parallel with said first valve means and having one end thereof fixed to said first cover, L-shaped hinged valve means having a spool for opening and closing said third port and a valve lever extending in parallel with said spool to be caught by said second step and coupling with the other end of supporting rod by a pin, and a third spring interposed between said valve lever and said first cover to surround said ball slider for pressing said valve lever;
an armature moving in response to a magnetic force generated from said solenoid assembly; and
a push rod extending from said first chamber to said second chamber through said barrier hole and having one end thereof fixed to said armature and the other end thereof fixed to said ball slider,
further comprising a cylindrical core provided within said second chamber for movably passing said push rod through a hole formed thereto in a coaxial relationship and pulling said armature by generating a magnetic force in response to the magnetic flux produced from said solenoid coil,
wherein in said normal state, said valve lever stands apart from said second step by a predetermined distance which is substantially equal to the distance between said inlet ball and said first port
wherein said first port is a nozzle hole of an inlet nozzle provided at the center of said first cover, said second port is an opening provided to said housing, said third port is a nozzle hole of an exhaust nozzle provided to first cover apart from said inlet nozzle, and said barrier wall is a bushing,
further comprising a cylindrical sealing member provided within said second chamber coaxially with said housing,
wherein said bobbin is provided to surround said sealing member, and one end of said sealing member is hermetically coupled with the inner wall of said housing and the other end of said sealing member is hermetically fitted to a groove formed to said second cover so that said bobbin is protected from the fluid,
wherein said inlet nozzle is provided with an inlet ball seating surface for seating said inlet ball, said exhaust nozzle is provided with a valve seating surface for seating said spool of said hinged valve, and said inlet ball seating surface and said valve seating surface are shaped to match with the shapes of said inlet ball and said spool to be seated, so that said first port is closed when said inlet ball is seated on said inlet ball seating surface, and said third port is closed when said spool is seated on said valve seating surface, wherein said first cover is a circular flat plate, and a recess for receiving part of said armature is formed at the center portion of a side of said second cover, wherein said ball slider is provided with a first extending portion extending from one end of said ball slider to which said inlet ball is located and a second extending portion extending from the other end of said ball slider and being larger than said first extending portion in outer diameter, and said second step is formed by the difference in outer diameter between said first extending portion and said second extending portion, wherein said valve lever is a rectangular flat plate having a first hole provided adjacent to one end thereof longitudinally opposite to the other end thereof to which said spool is perpendicularly fixed for inserting said ball slider and a second hole provided between said first hole and the other end thereof for inserting one end of said supporting rod, said one end of said supporting rod and said valve lever are connected with each other by said pin so that said valve lever is rocked around said pin, and said second step cannot pass through said first hole.

* * * * *